(12) United States Patent
Virani

(10) Patent No.: US 12,487,779 B2
(45) Date of Patent: *Dec. 2, 2025

(54) MEMORY DEVICE OPERATIONS FOR UNALIGNED WRITE OPERATIONS

(71) Applicant: Micron Technology, Inc., Boise, ID (US)

(72) Inventor: Scheheresade Virani, Frisco, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/731,756

(22) Filed: Jun. 3, 2024

(65) Prior Publication Data

US 2024/0319922 A1 Sep. 26, 2024

Related U.S. Application Data

(63) Continuation of application No. 17/822,895, filed on Aug. 29, 2022, now Pat. No. 12,001,717.

(51) Int. Cl.
*G06F 3/06* (2006.01)

(52) U.S. Cl.
CPC .......... *G06F 3/0659* (2013.01); *G06F 3/0619* (2013.01); *G06F 3/0656* (2013.01); *G06F 3/0679* (2013.01)

(58) Field of Classification Search
None
See application file for complete search history.

(56) References Cited

U.S. PATENT DOCUMENTS

| | | |
|---|---|---|
| 12,001,717 B2 | 6/2024 | Virani |
| 2013/0073784 A1 | 3/2013 | Ng et al. |
| 2019/0065094 A1 | 2/2019 | Thomas |
| 2019/0121730 A1 | 4/2019 | Palmer |
| 2022/0035561 A1* | 2/2022 | Ha .................. G06F 3/0673 |
| 2022/0050626 A1 | 2/2022 | Oh et al. |
| 2022/0276962 A1* | 9/2022 | Segev ............... G06F 3/064 |
| 2022/0283739 A1 | 9/2022 | Benisty |

* cited by examiner

*Primary Examiner* — Yaima Rigol
(74) *Attorney, Agent, or Firm* — Harrity & Harrity, LLP

(57) ABSTRACT

Implementations described herein relate to memory device operations for unaligned write operations. In some implementations, a memory device may receive, from a host device, a write command indicating data having a first size that corresponds to a first write unit and a first logical address. The memory device may allocate a set of buffers for the write command. The memory device may determine a set of physical addresses corresponding to a physical address that is associated with the second size, where the set of physical addresses are each associated with the first size. The memory device may merge stored data from the set of physical addresses to one or more buffers, from the set of buffers, that do not include the data to generate a data unit having the second size. The memory device may write the data unit to memory indicated by the set of physical addresses.

20 Claims, 11 Drawing Sheets

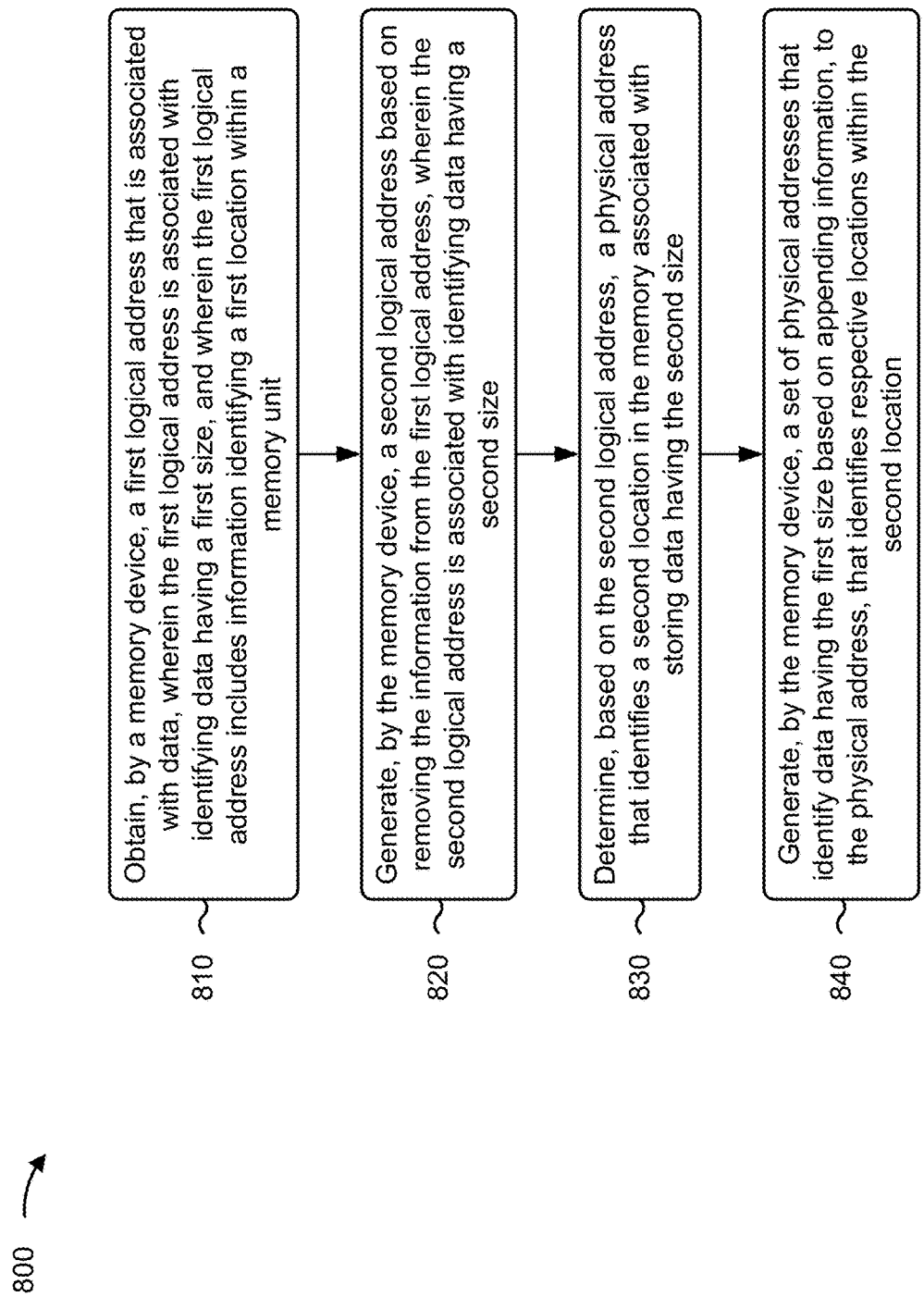

MEMORY DEVICE OPERATIONS FOR UNALIGNED WRITE OPERATIONS

RELATED APPLICATION

This application is a continuation of U.S. patent application Ser. No. 17/822,895, filed Aug. 29, 2022 (now U.S. Pat. No. 12,001,717), which is incorporated herein by reference in its entirety.

TECHNICAL FIELD

The present disclosure generally relates to memory devices, memory device operations, and, for example, to memory device operations for unaligned write operations.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, the electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

A non-volatile memory device, such as a NAND memory device, may use circuitry to enable electrically programming, erasing, and storing of data even when a power source is not supplied. Non-volatile memory devices may be used in various types of electronic devices, such as computers, mobile phones, or automobile computing systems, among other examples.

A non-volatile memory device may include an array of memory cells, a page buffer, and a column decoder. In addition, the non-volatile memory device may include a control logic unit (e.g., a controller), a row decoder, or an address buffer, among other examples. The memory cell array may include memory cell strings connected to bit lines, which are extended in a column direction.

A memory cell, which may be referred to as a "cell" or a "data cell," of a non-volatile memory device may include a current path formed between a source and a drain on a semiconductor substrate. The memory cell may further include a floating gate and a control gate formed between insulating layers on the semiconductor substrate. A programming operation (sometimes called a write operation) of the memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the memory cell is concurrently performed in units of sectors sharing the bulk area (referred to as "blocks"), by applying a high negative voltage, which may be referred to as an "erase voltage" or "Vera," to the control gate and a configured voltage to the bulk area to generate the F-N tunneling. In this case, electrons accumulated on the floating gate are discharged into the source area, so that the memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A non-volatile memory device may include a plurality of page buffers connected between the bit lines and the column decoder. The column decoder is connected between the page buffer and data lines.

BRIEF DESCRIPTION OF THE DRAWINGS

FIG. 8 is a flowchart of an example method associated with memory device operations for unaligned write operations.

DETAILED DESCRIPTION

Figure 1:
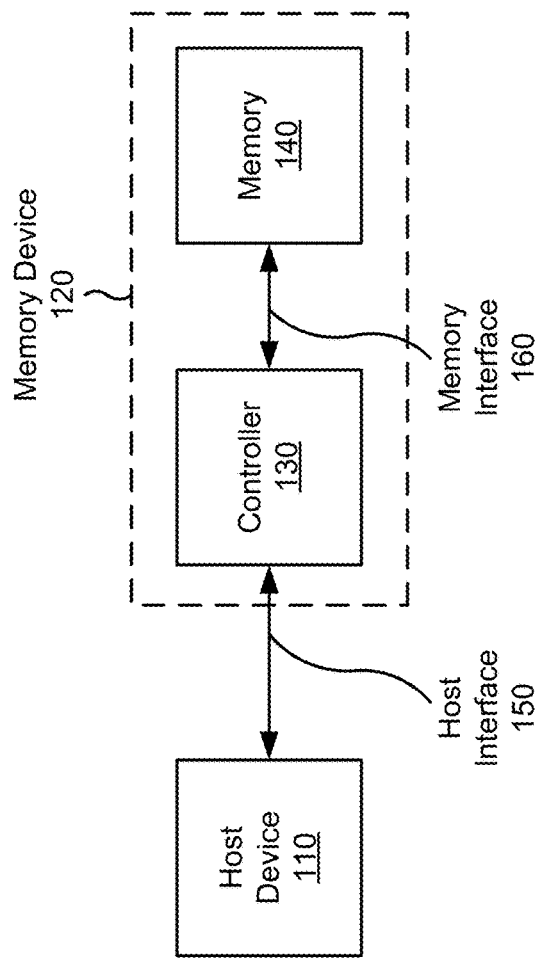
FIG. 1 is a diagram illustrating an example system capable of memory device operations for unaligned write operations.

A host device may use a logical address space to access data stored by a memory device. The logical address space can identify a group of logical units, such as logical blocks. For some types of memory devices (e.g., NAND), a logical block may be the smallest erase unit. For example, a size of data in a logical block may be 512 bytes, 4096 bytes (4 kilobytes (KB)), 8192 bytes (8 KB), or 16384 bytes (16 KB), among other examples, depending on a configuration of the memory device. In some examples, a logical block may be a group of logical pages. A logical page may be an abstraction of physical pages. A memory device may define a logical page to equal to a particular unit of physical storage (e.g., a physical page and/or a physical block). A logical block address (LBA) may be an identifier of a logical block.

When a host device requests to access data (e.g., read data or write data), the host device may send a data access request to a memory device directed to a logical address space. For example, the host device may provide a logical address (e.g., an LBA and/or a namespace identifier) identifying a location of which the data is to be stored or read. Because the data from the host device is eventually to be stored at a physical address within the memory device, the memory device may maintain a logical to physical (L2P) translation map, or table, to identify a physical location where the data corresponding to each logical address resides on memory of the memory device. The L2P table may include a number of L2P entries. Each entry in an L2P map may identify a physical location corresponding to a particular logical address. The L2P map tracks every logical address segment that has been written to the memory device by maintaining a physical address corresponding to the logical address. For example, an L2P entry may include an index of the logical address, a corresponding range of physical addresses, and/or metadata (such as a flag that indicates whether the data at an address is valid or invalid), among other examples.

In some examples, the memory device may manage the logical address space using a translation unit (TU). For some types of memory devices (e.g., NAND memory device), a TU may be a base granularity of data managed by the memory device. A TU may include a predefined number of logical units (e.g., logical pages and/or logical blocks). In some example, a TU may be predefined to include one logical block, so that the size of the TU is equal to a size of the logical block. In some other examples, a TU may be predefined to include one logical page, so that the size of the TU is equal to the size of the logical page. In some other example, a TU is predefined to include multiple logical blocks or multiple logical pages. In some cases, each entry in an L2P table may identify a physical location corresponding to a particular TU.

The host device may send a write request (or write command) to write data to the memory device. The write request can include various information, such as a set of data, and/or the logical address to store the data, among other examples. The data segments received in a write request can be referred to as the received TUs. A write request can include multiple received TUs. A write request can include data that has a size (e.g., 4 KB) that is same or multiple of the size (e.g., 4 KB) of a TU in the L2P table. This may be referred to as an "aligned write" request, because the boundaries of the received TUs align (e.g., match) with boundaries of TUs in the L2P table. In other cases, a write request may include a received TU that has a size that is less than the size of a TU in the L2P table. This may be referred to as an "unaligned write" request.

As a capacity of a memory device increases (e.g., as a size of a memory associated with a memory device increases), a quantity of available physical locations where data may be stored may also increase. As a result, a quantity of entries stored in the L2P table may increase (e.g., to map to the additional physical addresses). Further, a size of each individual entry in the L2P table may also increase because additional information may be needed to identify the additional physical addresses. This may result in a size of the L2P table increasing. To reduce a size of the L2P table that is stored by the memory device, a TU size associated with the L2P table may be increased. For example, rather than using a TU that identifies an address of 4 KB of data (e.g., referred to herein as a "4K TU"), the memory device may use a TU that identifies an address of 16 KB of data (e.g., referred to herein as a "16K TU"). Because of the larger TU size used by the memory device for the L2P table (e.g., because of the increased granularity), a quantity of entries in the L2P table may be reduced. As a result, a size of the L2P table may be reduced. As used herein, a "size" of a logical address (e.g., a TU address, an LBA, or another logical address) may refer to a size of data identified by, or mapped to, the logical address (e.g., and not to a size of the logical address itself). For example, a 4 KB logical address may be associated with identifying 4 KB of data.

However, using a larger TU size may result in an increased likelihood of unaligned write requests from the host device. For example, the host device may be configured to request data using a particular size (e.g., using an LBA that identifies 4 KB of data, which may be referred to herein as a "4K LBA"). However, because of the larger TU size used by the memory device (e.g., a 16K TU), the memory device may be unable to write or read only in the smaller granularity requested by the host device. Rather, the memory device may be configured to write or read data in units of size equivalent to the TU size (e.g., 16 KB). Therefore, the memory device may be required to perform additional operations or functions to process the write request for data that has a size that is smaller than the configured TU size. This may consume processing resources and/or processing time associated with performing operations to write a smaller size of data (e.g., 4 KB) when the memory device is configured to operate using a larger TU size (e.g., 16 KB).

Some implementations described herein enable memory device operations for unaligned write operations. For example, the memory device may be configured to use a logical unit having a larger size for entries of an L2P table (e.g., a unit having a size of 16 KB), while allowing other components or modules of the memory device to operate using a logical unit having a smaller size (e.g., 4 KB or 512 bytes). For example, the memory device may be configured to use a TU having a given size (e.g., 4 KB). The memory device may be configured to use a logical unit for the L2P table that includes a set or group of TUs (e.g., which may be referred to herein as a "bundled unit"), such as 2 TUs, 4 TUs, or another quantity of TUs. In some implementations, only a component of the memory device that performs LBA translation (e.g., using the LBA table) and a component that allocates temporary memory (e.g., buffers or caches) for unaligned write requests may be configured to use the bundled unit (BU). Other components or modules of the memory device may be configured to use the TU. This may simplify the operations for unaligned write requests because, for the operations of the other components or modules of the memory device, the write request may be an aligned write request (e.g., a size of the data may align with the TU size).

In some implementations, when a write request is received by the memory device, the memory device may configured to allocate one or more temporary memory locations (e.g., buffers or caches) for the write request. The memory device may allocate a quantity of buffers that is equal to the quantity of TUs that are included in a BU. For example, if a TU size is 4 KB and a BU size is 16 KB, then the memory device may allocate 4 buffers for the write request (e.g., because there may be 4 TUs included in the BU). The memory device may write data (e.g., user data) indicated by the write request to one or more of the allocated buffers (e.g., based on an index of a TU associated with a logical address indicated by the write request, as explained in more detail elsewhere herein). Data may be read from memory to merge stored data into the allocated buffers. The memory device may be configured to write the merged data to the memory of the memory device.

In some implementations, the memory device may be configured to translate a logical address indicated by the write request into a physical address. For example, the write request may indicate a NK LBA, where N is a size of data identified by the LBA (e.g., which may be translated by the memory device into a NK TU address (TUA)). The memory device may be configured to modify the NK TUA into a TUA that identifies a size of data (e.g., M) equivalent to a size of the BU (e.g., by masking or removing data or bits from the TUA). For example, the memory device may be configured to modify the NK TUA into an MK TUA. The memory device may be configured to translate the MK TUA into an MK physical address (e.g., an MK flash logical address (FLA), which may relate to a physical address of the NAND cell referred to as a platform physical address (PPA)). The memory device may be configured to modify the MK physical address into a set of NK physical addresses (e.g., by appending information or bits to the MK physical address identifying more granular physical locations). The memory device may be configured to read data from the set of NK physical addresses or write data to the set of NK physical addresses. This may enable other components of the memory device to be configured to operate using a TU having a size of N, rather than a larger size (e.g., M).

As a result, the memory device may be enabled to use a larger logical unit size for an L2P table (e.g., using a BU), while enabling other components of the memory device to use a smaller logical unit (e.g., to use a TU). This may simplify operations associated with unaligned write requests by limiting additional operations or functions to an L2P translation operation and/or a buffer allocation operation for the write request. Therefore, the memory device may not need to perform additional operations or functions to process the write request for data that has a size that is smaller than the size of the logical unit used for entries of the L2P table. This may conserve processing resources and/or processing time that would have otherwise been associated with performing operations to write a smaller size of data (e.g., 4 KB) when the memory device is configured to operate using a larger size (e.g., 16 KB) for entries of the L2P table.

FIG. 1 is a diagram illustrating an example system 100 capable of memory device operations for unaligned write operations. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to use a logical unit having a larger size for entries of an L2P table (e.g., a unit having a size of 16 KB), while allowing other components or modules of the memory device to operate using a logical unit having a smaller size (e.g., 4 KB or 512 bytes). For example, the memory device may be configured to use a TU having a given size (e.g., 4 KB). The memory device may be configured to use a logical unit for the L2P table that includes a set or group of TUs (e.g., a BU), such as 2 TUs, 4 TUs, or another quantity of TUs. In some implementations, only a component of the memory device that performs LBA translation (e.g., using the LBA table) and a component that allocates temporary memory (e.g., buffers or caches) for unaligned write requests may be configured to use the BU. Other components or modules of the memory device may be configured to use the TU. This may simplify the operations for unaligned write requests because, for the operations of the other components or modules of the memory device, the write request may be an aligned write request (e.g., a size of the data may align with the TU size).

As indicated above, FIG. 1 is provided as an example. Other examples may differ from what is described with regard to FIG. 1.

Figure 2:
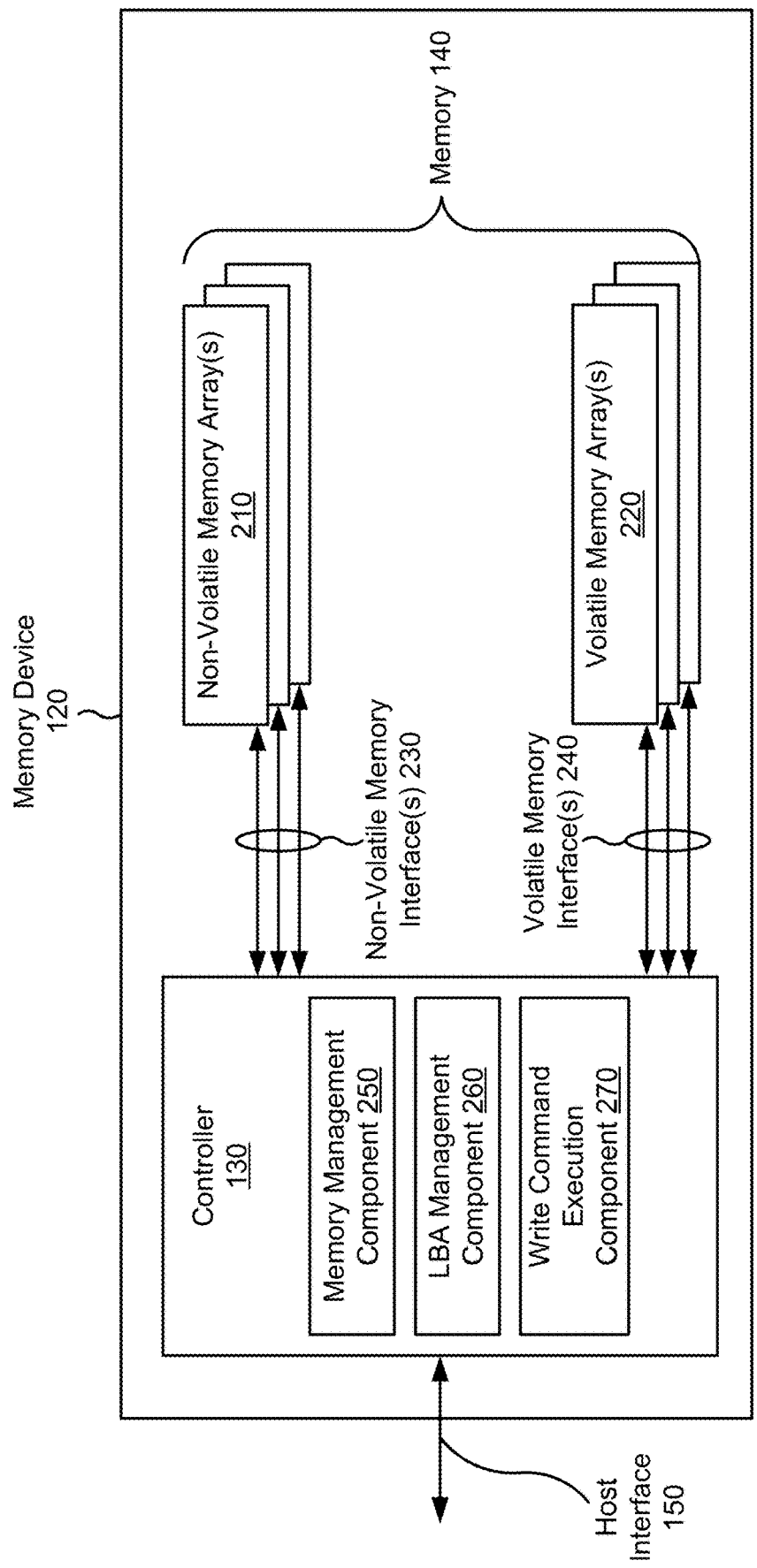
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The controller 130 may transmit signals to and receive signals from a non-volatile memory array 210 using a non-volatile memory interface 230. The controller 130 may transmit signals to and receive signals from a volatile memory array 220 using a volatile memory interface 240.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 250, an LBA management component 260, and/or a write command execution component 270, among other examples. In some implementations, one or more of these components are implemented as one or more instructions (e.g., firmware) executed by the controller 130. Alternatively, one or more of these components may be implemented as dedicated integrated circuits distinct from the controller 130.

The memory management component 250 may be configured to manage performance of the memory device 120. For example, the memory management component 250 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 250, such as information regarding memory block age, memory block erase count, and/or error information associated with a memory partition (e.g., a memory cell, a row of memory, a block of memory, or the like).

The LBA management component 260 may be configured to perform one or more operations associated with LBA, as described in more detail elsewhere herein. For example, the LBA management component 260 may be configured to map logical memory blocks to physical addresses of a memory unit. The LBA management component 260 may be configured to store information associated with one or more LBA addresses in a lookup table (e.g., an L2P table). In some implementations, the LBA management component 260 may be referred to as a translation component. The LBA management component 260 may be configured to determine, based on an L2P mapping, a physical address associated with a logical address of data indicated by a write command (e.g., where the data has a size that is less than a size of a logical unit used by L2P mapping). The physical address may be associated with a size of data that is equivalent to the size of a logical unit used by L2P mapping. The LBA management component 260 may be configured to determine a set of physical addresses having a second size (e.g., having a size equivalent to a configured TU size) based on the logical address of the data and the physical address identified via the L2P mapping.

The write command execution component 270 may be configured to perform one or more operations associated with executing or processing a write command (or write request) that is received from a host device (e.g., the host device 110). For example, the write command execution component 270 may be configured to allocate a set of buffers for the write command, where a quantity of the set of buffers is based on a quantity of the logical units (e.g., TUs) included in a configured logical unit for the L2P table (e.g., a BU size). In some implementations, the write command execution component 270 may be configured to store the data in at least one buffer from the set of buffers. In some implementations, the write command execution component 270 may be configured to merge stored data into the set of buffers. The write command execution component 270 may be configured to cause data stored in the set of buffers to be written to the memory (e.g., the memory 140).

Figure 5A:
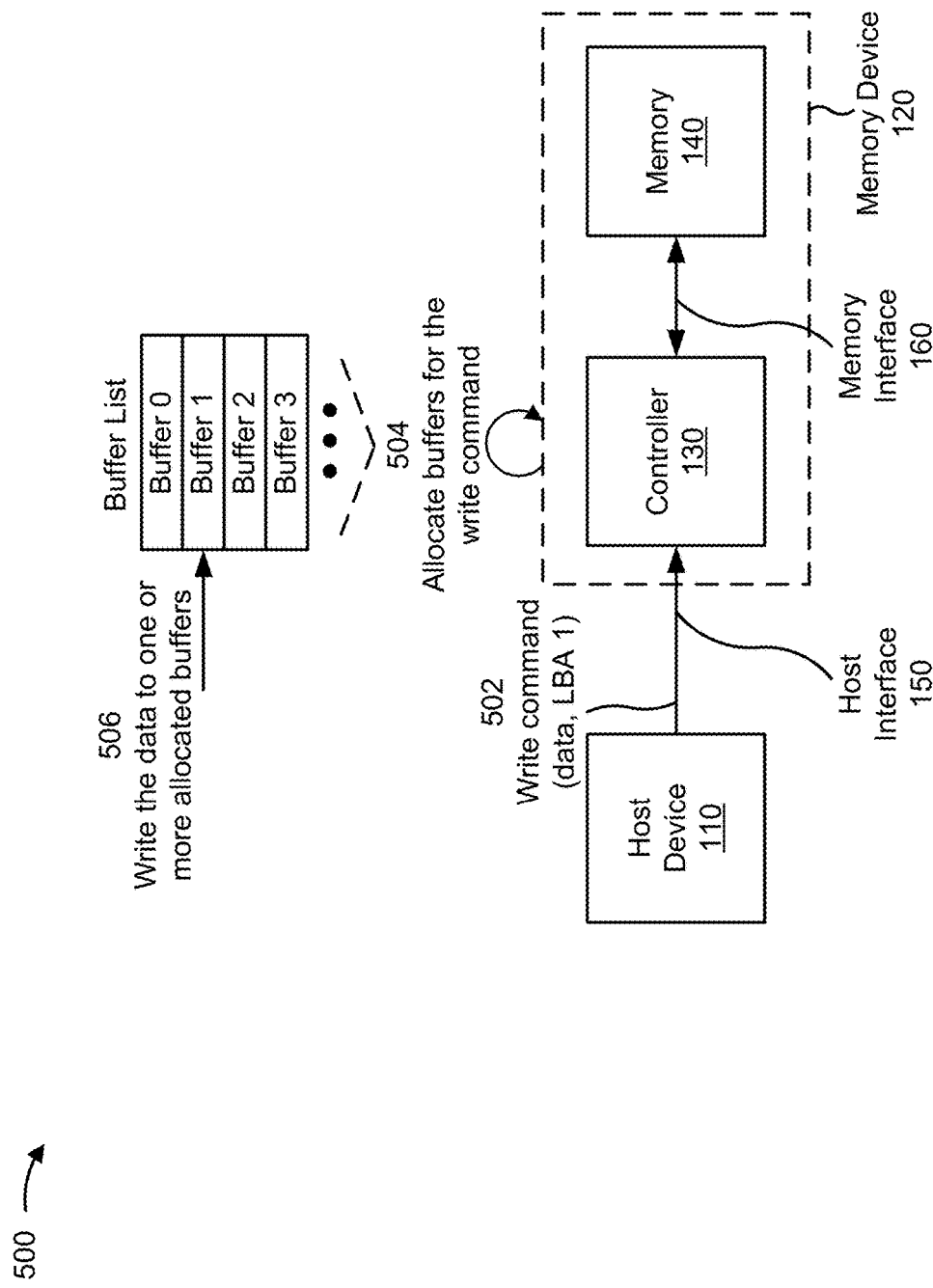
FIGS. 5A-5D are diagrams illustrating an example associated with memory device operations for unaligned write operations.
Figure 5B:
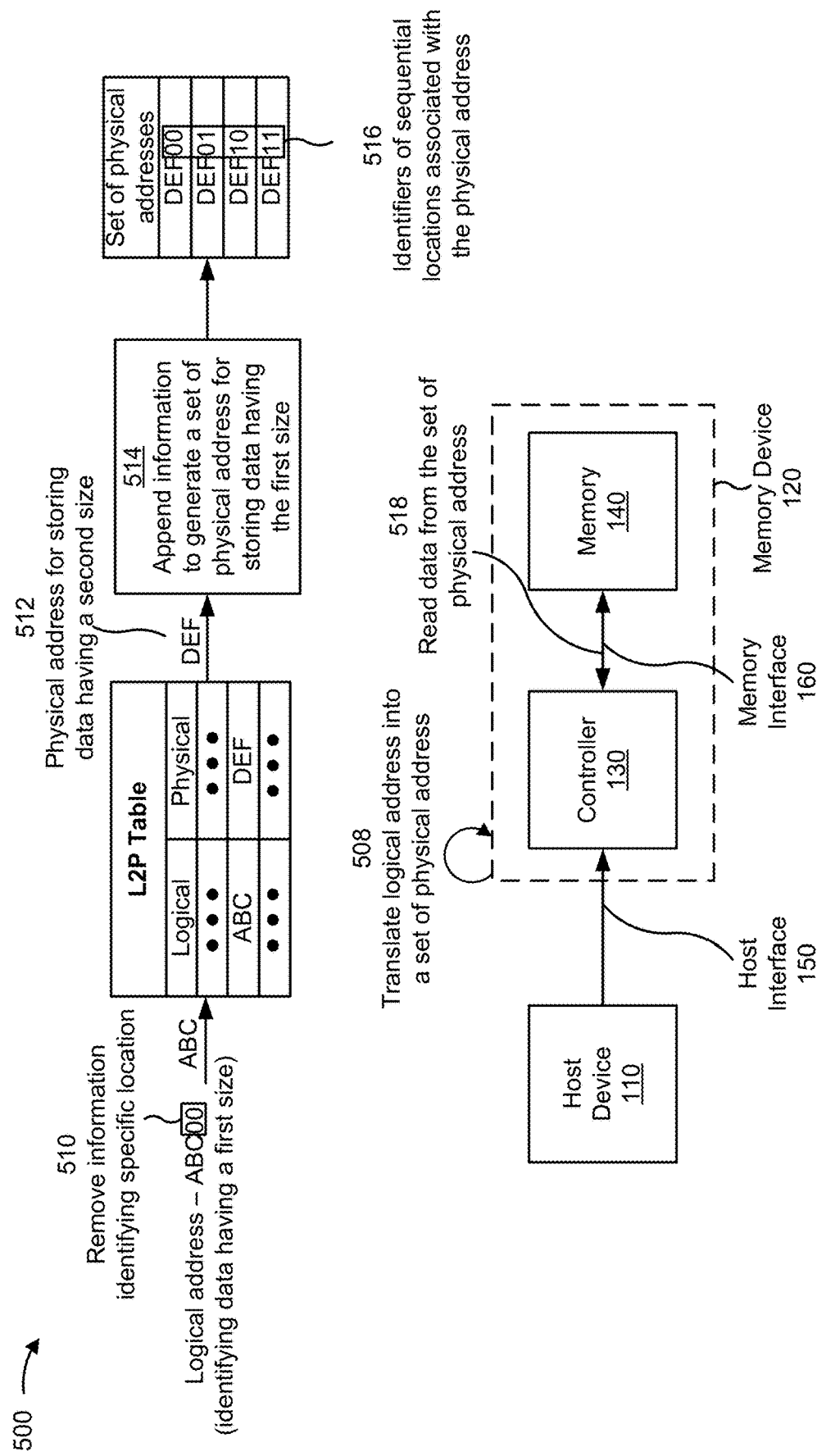
Figure 5C:
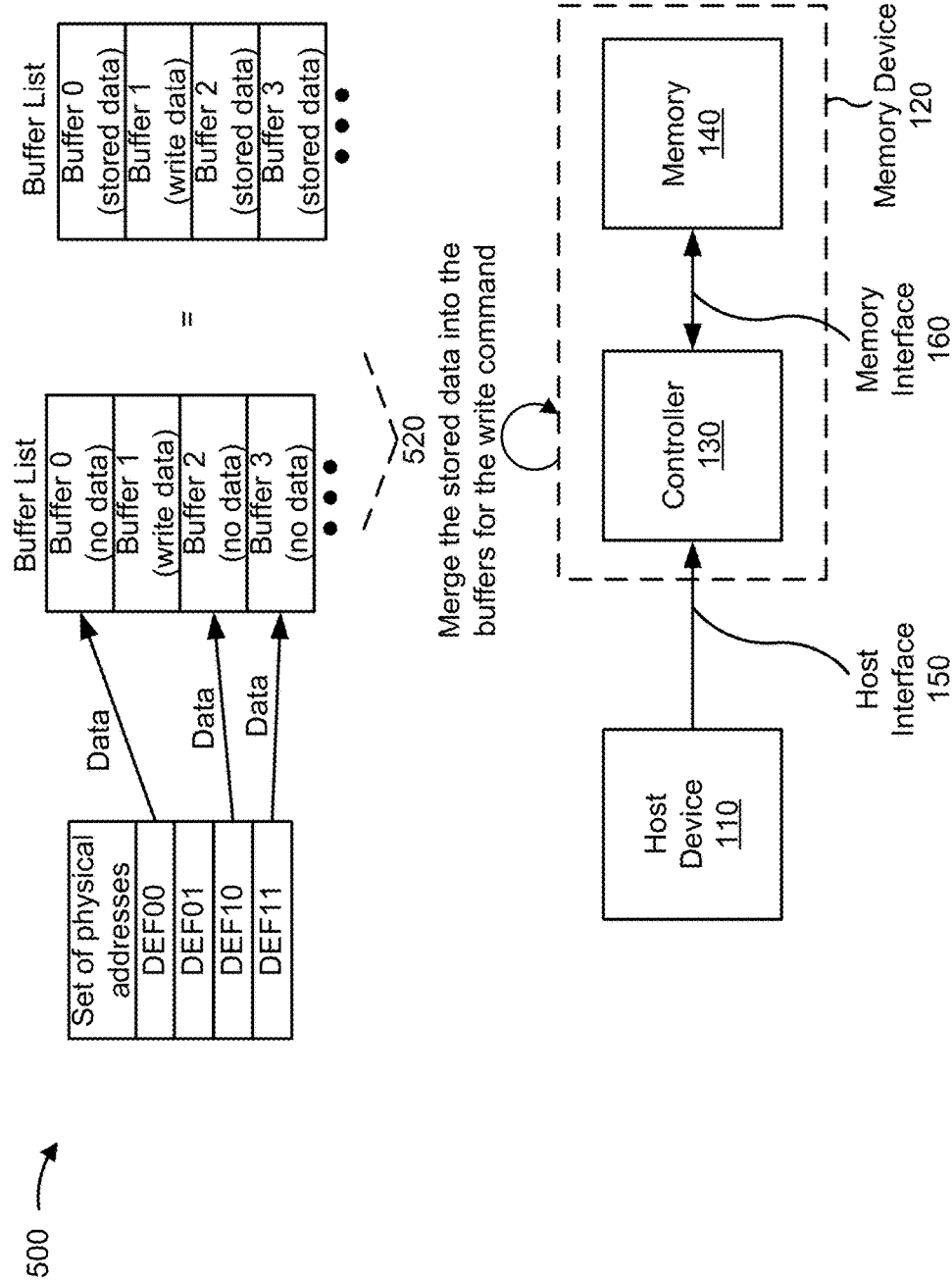
Figure 5D:
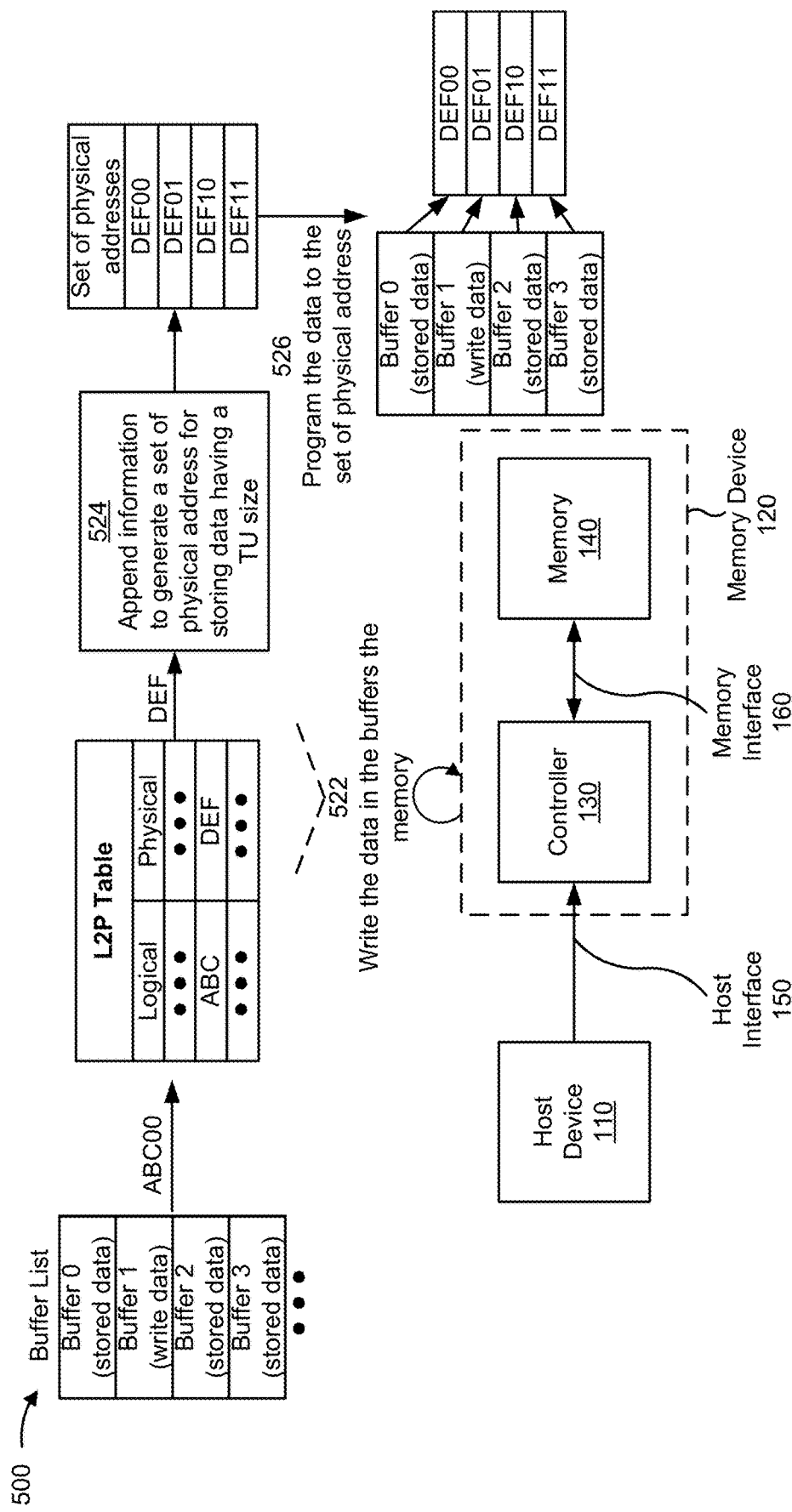
Figure 6:
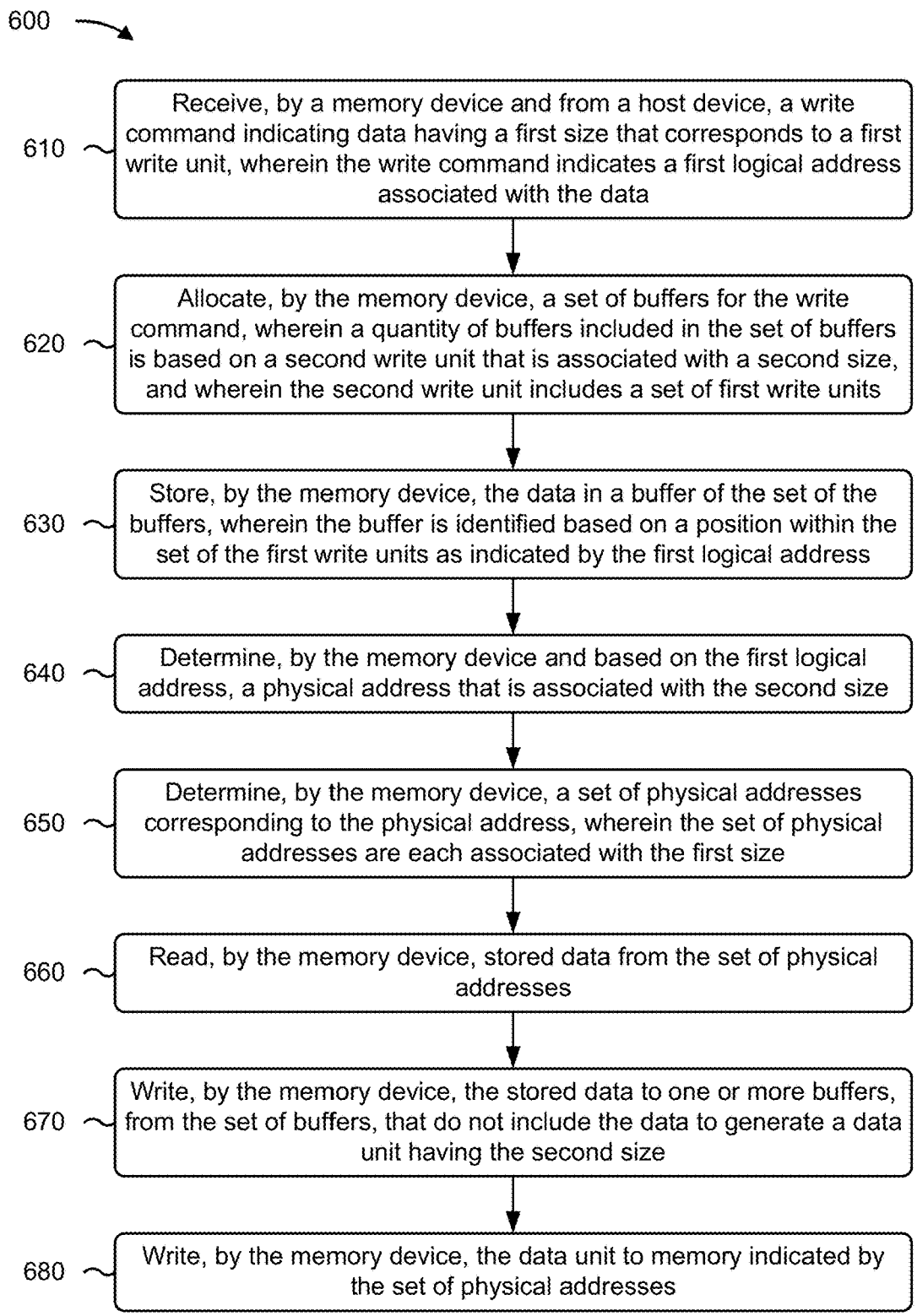
FIG. 6 is a flowchart of an example method associated with memory device operations for unaligned write operations.
Figure 7:
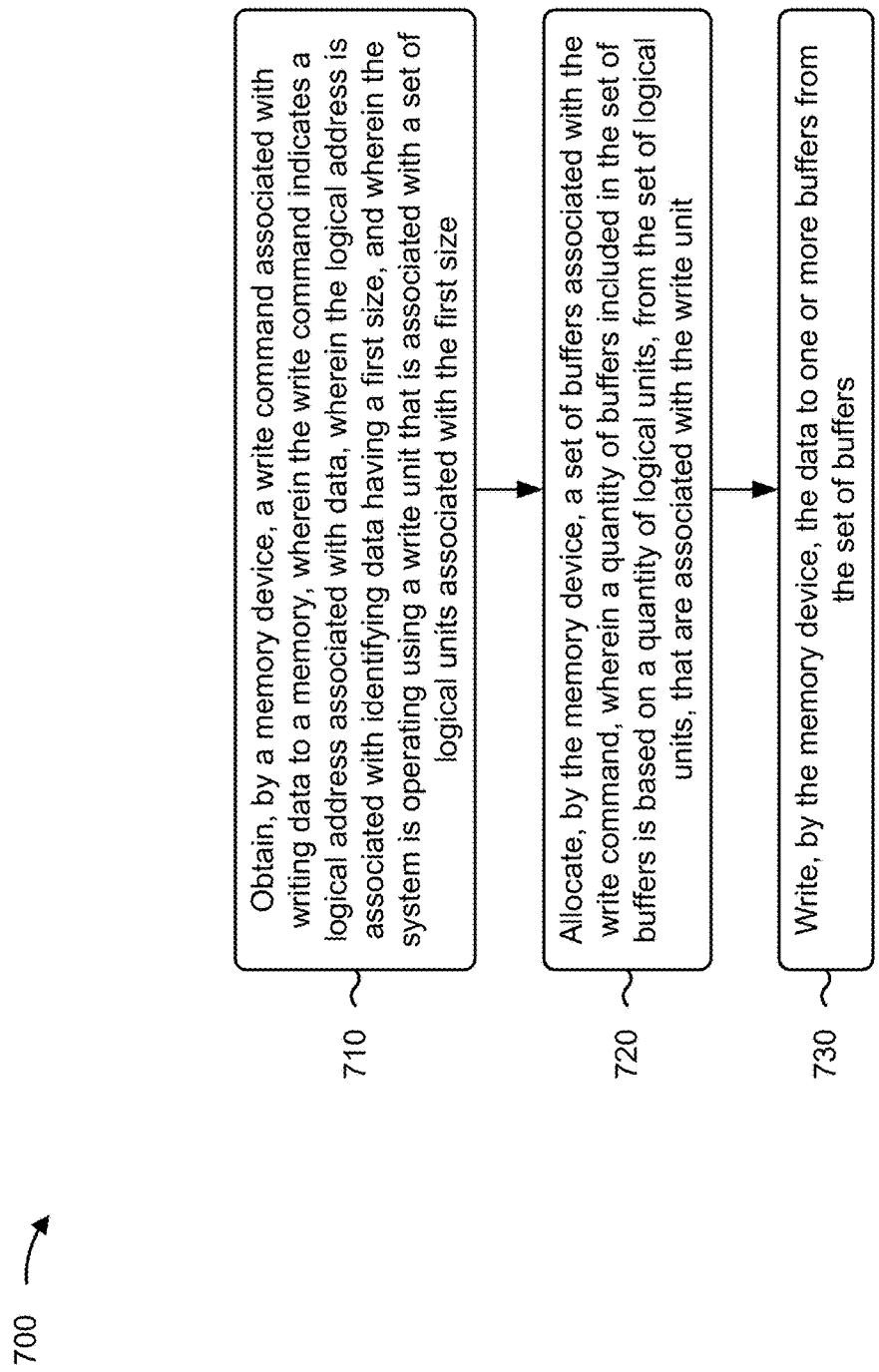
FIG. 7 is a flowchart of an example method associated with memory device operations for unaligned write operations.

One or more devices or components shown in FIG. 2 may be configured to perform operations described elsewhere herein, such as one or more operations of FIGS. 5A-5D and/or one or more process blocks of the methods of FIGS. 6-8. For example, the controller 130, the LBA management component 260, and/or the write command execution component 270 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
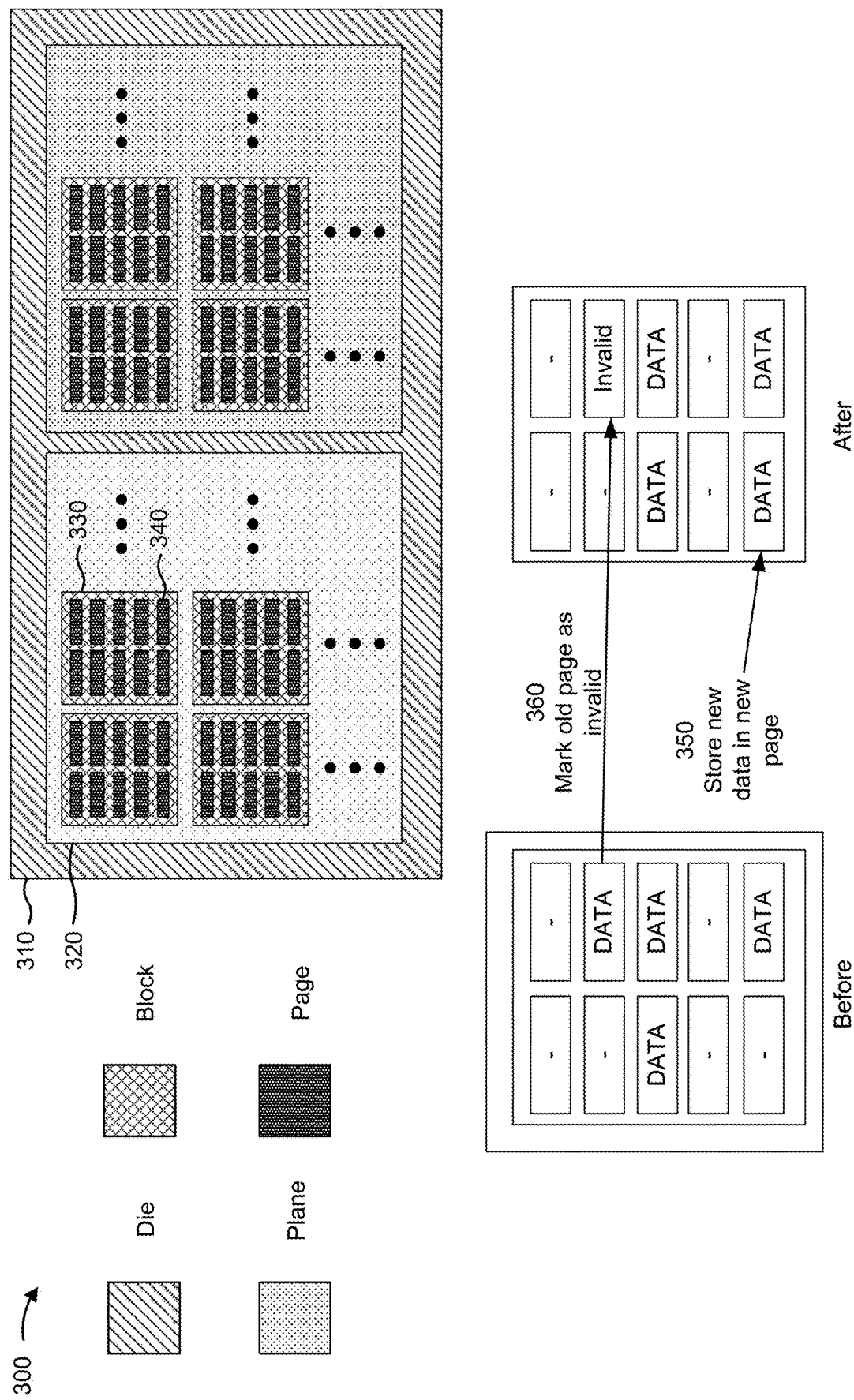
FIG. 3 is a diagram illustrating an example memory architecture that may be used by the memory device.

FIG. 3 is a diagram illustrating an example memory architecture 300 that may be used by the memory device 120. The memory device 120 may use the memory architecture 300 to store data. As shown, the memory architecture 300 may include a die 310, which may include multiple planes 320. A plane 320 may include multiple blocks 330. A block 330 may include multiple pages 340. Although FIG. 3 shows a particular quantity of planes 320 per die 310, a particular quantity of blocks 330 per plane 320, and a particular quantity of pages 340 per block 330, these quantities may be different than what is shown. In some implementations, the memory architecture 300 is a NAND memory architecture.

The die 310 is a structure made of semiconductor material, such as silicon. The memory device 120 may be fabricated on the die 310 (e.g., via a semiconductor device fabrication process). In some implementations, a die 310 is the smallest unit of memory that can independently execute commands. A memory chip or package may include one or more dies 310.

Each die 310 of a chip includes one or more planes 320. A plane 320 is sometimes called a memory plane. In some implementations, identical and concurrent operations can be performed on multiple planes 320 (sometimes with restrictions). Each plane 320 includes multiple blocks 330. A block 330 is sometimes called a memory block. Each block 330 includes multiple pages 340. A page 340 is sometimes called a memory page. A block 330 is the smallest unit of memory that can be erased. In other words, an individual page 340 of a block 330 cannot be erased without erasing every other page 340 of the block 330. A page 340 is the smallest unit of memory to which data can be written (i.e., the smallest unit of memory that can be programmed with data). The terminology "programming" memory and "writing to" memory may be used interchangeably. A page 340 may include multiple memory cells that are accessible via the same access line (sometimes called a word line).

In some implementations, read and write operations are performed for a specific page 340, while erase operations are performed for a block 330 (e.g., all pages 340 in the block 330). In some implementations, to prevent wearing out of memory, all pages 340 of a block 330 may be programmed before the block 330 is erased to enable a new program operation to be performed to a page 340 of the block 330. After a page 340 is programmed with data (called "old data" below), that data can be erased, but that data cannot be overwritten with new data prior to being erased. The erase operation would erase all pages 340 in the block 330, and erasing the entire block 330 every time that new data is to replace old data would quickly wear out the memory cells of the block 330. Thus, rather than performing an erase operation, the new data may be stored in a new page (e.g., an empty page), as shown by reference number 350, and the old page that stores the old data may be marked as invalid, as shown by reference number 360. The memory device 120 may then point operations associated with the data to the new page and may track invalid pages to prevent program operations from being performed on invalid pages prior to an erase operation. When the pages 340 of a block 330 are full (e.g., all or some threshold quantity of pages are either invalid or store valid data), the memory device 120 may copy the valid data (e.g., to a new block or to the same block after erasure) and may erase the block 330.

As indicated above, FIG. 3 is provided as an example. Other examples may differ from what is described with regard to FIG. 3.

Figure 4:
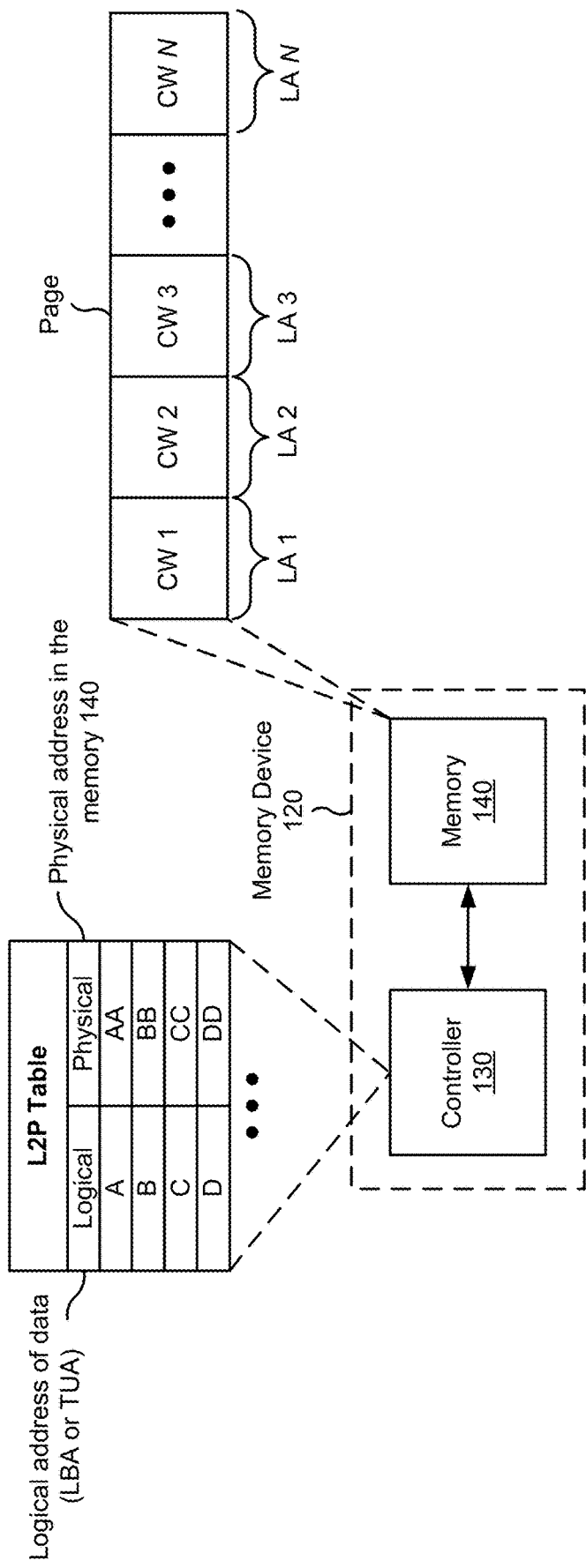
FIG. 4 is a diagram illustrating an example logical address to physical address translation.

FIG. 4 is a diagram illustrating an example logical address to physical address translation.

In some examples, a block of data transferred during media management can be or can be referred to as a TU and can be the smallest size of data internally managed by the memory device 120, by the controller 130, and/or by the host device 110. A TU may correspond to a logical address (e.g., a TUA or an LBA) and a physical address (e.g., an abstracted physical address such as a FLA, which may relate to a physical address of the NAND cell referred to as a PPA). Physical memory elements of a storage device can be arranged as logical memory blocks addressed via LBA. A logical memory block may be the smallest LBA addressable memory unit. Each LBA address may identify a single logical memory block that can be mapped to a particular physical address of a memory unit in the memory device 120.

The concept of namespace for a storage device is similar to the concept of partition in a hard disk drive for creating logical storages. Different portions of the memory 140 can be allocated to different namespaces and thus can have LBA addresses configured independently from each other within their respective namespaces. Each namespace identifies a quantity of memory of the memory device 120 addressable via LBA. A same LBA address can be used in different namespaces to identify different memory units in different portions of the memory 140. For example, a first namespace allocated on a first portion of the memory 140 having z memory units can have LBA addresses ranging from 0 to z−1; and a second namespace allocated on a second portion of the memory 140 having y memory units can have LBA addresses ranging from 0 to y−1.

The host device 110 may send a request to the memory device 120 for the creation, deletion, or reservation of a namespace. After a portion of the storage capacity of the storage device is allocated to a namespace, an LBA address in the respective namespace logically represents a particular memory unit in the memory 140, although the particular memory unit logically represented by the LBA address in the namespace may physically correspond to different memory units at different time instances (e.g., as in SSDs). For example, a read command or a write command may indicate an LBA address and a namespace identifier associated with a unit of data. LBA translation may include translating the LBA address and the namespace identifier into a TU address. The TU address may be translated (e.g., via an L2P mapping table) into a physical address (e.g., an FLA) associated with a location of the unit of data in the memory 140 (e.g., the physical address may point to a die, plane, block, and/or page associated with the unit of data in the memory 140).

For example, as shown in FIG. 4, the controller 130 (and/or another component of the memory device 120) may maintain and/or store an L2P table (e.g., an L2P mapping table). The L2P mapping table may also be referred to as an LBA table or an LBA translation table. Each entry of the L2P mapping table maps an LBA address to a corresponding physical address of the data block on the memory device 120. The L2P mapping table may contain references or pointers to data that is physically stored in the memory device 120. When the L2P mapping table is updated based on a write command, the corresponding L2P entry will point to actual data stored in the memory device 120. By contrast, when the L2P mapping table is updated based on a deallocate command, the L2P mapping table will not point to data stored on a memory device, but instead will contain a deallocate-specific marker which results in zeros (and/or an error message) being sent to the host device 110 in response to a subsequent read command.

The memory device 120 and/or the controller 130 may be configured to maintain the L2P table using a particular logical unit. In some examples, the logical unit may be a TU. In other words, each entry in the L2P table may include a TU address (e.g., identifying data having a size of a TU) and a physical address that is associated with storing data having the size of a TU (e.g., if the size of the TU is 4 KB, then the physical address may identify a physical address that is associated with storing 4 KB of data).

As shown in FIG. 4, in some examples, a memory page may be divided or segmented into a set of units, which may be referred to as a codeword (CW). A codeword may have a total size that includes a wrapper and a payload. The codeword payload may refer to the data (e.g., user data) that is encoded within the codeword. The codeword wrapper may refer to the error information that is encoded in the codeword along with the user data. The controller 130 may be configured to use a variable codeword wrapper size and a variable codeword payload size. The variable codeword wrapper and payload sizes can be programmable as a user function (e.g., programmable via the host interface 150) or can be programmed after manufacturing for a particular application. For example, the codeword wrapper size can be programmed according to a desired amount of error correction for the codeword payload. In some embodiments, the codeword payload size can be programmed based on the particular codeword wrapper size (e.g., where a fixed and/or integer number of codewords are designed to fit within a physical page such that the total size of the codeword is fixed while the wrapper and/or payload sizes are variable). Of the total codeword size, a larger codeword wrapper provides more error protection for the codeword payload, but results in a smaller codeword payload, and thus a reduced memory density in terms of user data because the user data is then split up into smaller portions each having a larger codeword wrapper stored therewith. Once a particular codeword wrapper and/or codeword payload size have been programmed, data can be error coded as codewords having the programmed payload size.

As shown in FIG. 4, a logical address (LA) may point to a particular codeword of a memory page. For example, a memory page may be divided into logical units (e.g., codewords), and a logical address may point to a particular logical unit within a memory page. This may enable the host device 110 to access data that is smaller than a size associated with the memory page. However, as described above, write operation may be performed by the memory device using the memory page as the smallest write unit. In other words, to perform a write operation, the memory device may write data to all logical units (e.g., all codewords) of a page (e.g., even if new data being written to the page is only included in one or more, but not all, of the codewords of the page). For example, when a write command indicates that data is to be written to a portion of a page (e.g., to one or more codewords), the memory device 120 may be configured to perform a read-modify-write operation. The read-modify-write operation may include reading the page, modifying a portion of the page (e.g., with data indicated by the write command), and writing the entire page to the memory 140.

As indicated above, FIG. 4 is provided as an example. Other examples may differ from what is described with regard to FIG. 4.

FIGS. 5A-5D are diagrams illustrating an example 500 associated with memory device operations for unaligned write operations. In some implementations, the memory device 120 and/or the controller 130 may be configured with a TU size. For example, each TUA may be associated with identifying data having a size of the TU size (e.g., a 4 KB TU may be associated with identifying or pointing to 4 KB of data). In some implementations, one or more components of the controller 130 may be configured with a BU size. A BU may include a set or group of TUs. For example, a BU size may be based on a quantity of TUs included in a given BU. For example, a BU may include 1 TU, 2, TUs, 4 TUs, or another quantity of TUs.

In other words, the memory device 120 and/or the controller 130 may be configured with a first logical unit (e.g., a BU) associated with a first size and a second logical unit (e.g., a TU) associated with a second size (e.g., where the first size is greater than the second size). The first logical unit (e.g., the BU) may be associated with a mapping of logical addresses to physical addresses associated with the memory 140 (e.g., may be a logical unit used for entries of an L2P table). The second logical unit (e.g., the TU) may be a smallest unit that is used by the memory device 120 for accessing (e.g., reading and/or writing) data from the memory 140. The TU may also be referred to herein as a "write unit." The first logical unit (e.g., the BU) may include a group of the second logical units (e.g., a group of TUs).

For example, the memory device 120 may store a table (e.g., an L2P table) indicating the mapping of logical addresses to the physical addresses associated with the memory. In some implementations, entries in the table correspond to respective physical addresses having the first size (e.g., having the size of the BU). For example, if a BU size is 16 KB, then the physical addresses in respective entries of the L2P table may identify physical locations on the memory 140 that store 16 KB of data. As an example, if a page of the memory 140 is associated with store 16 KB of data, then the physical addresses stored in the L2P table may point to individual pages (e.g., rather than more granular physical locations, such as to particular codewords within a page). As a result, a quantity of entries in the L2P table (and a size of each individual entry) may be reduced, thereby reducing a size of the L2P table (e.g., as compared to using more granular physical addresses in the L2P table, such as physical addresses pointing to smaller units of memory and/or to individual codewords). This may conserve memory resources associated with the memory device 120 storing the L2P table.

As shown in FIG. 5A, and by reference number 502, the memory device 120 may receive or obtain, from the host device 110, a write command. The write command may include data to be written to or programmed to the memory 140. The write command may include a logical address (e.g., one or more LBAs and/or one or more namespace identifiers) associated with the data and/or the location where the data is to be stored on the memory 140. The logical address may be associated with a size that is less than the logical unit (e.g., the BU) used by the memory device 120 for the L2P table. For example, the logical unit (e.g., the BU) may be associated with identifying data having a size of 16 KB and the logical address indicated by the write command may be associated with identifying data having a size of 4 KB (e.g., the logical address indicated by the write command may be a 4K LBA). In some implementations, the logical address indicated by the write command and the TU configured for the memory device 120 may be associated with identifying data having the same size. As described elsewhere herein, by configuring component(s) associated with buffer allocation and LBA translation with the BU size and enabling other components to use a TU for write operations may reduce a complexity that may otherwise be introduced for unaligned write operations. For example, components (e.g., other than component(s) associated with buffer allocation and LBA translation) may use a TU size that may be aligned with the logical address size (e.g., the LBA size) indicated by write commands from the host device 110, thereby simplifying write operations performed by the component of the memory device 120.

As shown by reference number 504, the memory device 120 and/or the controller 130 may allocate a set of buffers (e.g., temporary storage locations, such as DRAM buffers or SRAM buffers) for the write command. In some implementations, the buffers may be referred to as caches, temporary memory, and/or temporary storage locations, among other examples. In some implementations, the memory device 120 and/or the controller 130 may allocate a set of buffers for a BU associated with the logical address indicated by the write command. For example, the memory device 120 and/or the controller 130 may translate an LBA and/or a namespace identifier indicated by the write command into a TUA. The memory device 120 and/or the controller 130 may identify a BU that is associated with the TUA. For example, a given BU may include a set of (e.g., one or more) TUs. The memory device 120 and/or the controller 130 may identify a BU that includes the TUA that is associated with the write command. The memory device 120 and/or the controller 130 may allocate a set of buffers for the identified BU.

In some implementations, a quantity of buffers included in the set of buffers may be based on a quantity of the second logical units (e.g., TUs) included in a BU. For example, if a BU includes four TUs, then the memory device 120 and/or the controller 130 may allocate four buffers associated with the write command (e.g., buffer 0, buffer 1, buffer 2, and buffer 3 as shown in FIG. 5A). As another example, if a BU includes two TUs, then the memory device 120 and/or the controller 130 may allocate two buffers associated with the write command.

The set of buffers allocated by the memory device 120 and/or the controller 130 may be separate storage locations. The set of buffers may be associated with respective TUs. For example, the memory device 120 and/or the controller 130 may allocate a separate buffer for each TU included in a given BU (e.g., in the identified BU). This may enable write and/or read operations to be performed for an individual buffer using a TU size, rather than a BU size. For example, each buffer (e.g., of the set of buffers allocated for the write command) may be associated with storing data having a size of a TU (e.g., the set of buffers may each have a first size corresponding to the size of the TU).

As shown by reference number 506, the memory device 120 and/or the controller 130 may be configured to store the data (e.g., included in the write command received from the host device 110) in a buffer of the set of the buffers. For example, as shown in FIG. 5A, the memory device 120 and/or the controller 130 may store the data (e.g., user data to be written to the memory 140) in the buffer 1. In some implementations, depending on a size of data to be written or on a quantity of logical addresses (e.g., LBA addresses) indicated in the write command, the memory device 120 and/or the controller 130 may be configured to store data in multiple buffers of the set of buffers. For example, if a size of data to be written is greater than a size of a TU, then the memory device 120 and/or the controller 130 may be configured to store or write the data in multiple buffers of the set of buffers that are allocated for the write command. In other words, the memory device 120 and/or the controller 130 may be configured to write the data to one or more buffers from the set of buffers.

In some implementations, the memory device 120 and/or the controller 130 may be configured to identify a buffer (e.g., to store the data associated with the write command) from the set of buffers based on the logical address indicated by the write command. For example, the buffer may be identified based on a position within the set of the TUs (e.g., that are included in a BU) as indicated by the logical address. In other words, the memory device 120 and/or the controller 130 may be configured to identify data to be included in respective buffers, from the set of buffers, based on an order of the set of logical addresses included in the BU.

For example, the set of buffers may be associated with respective index values (e.g., buffer 0, buffer 1, buffer 2, and buffer 3 as shown in FIG. 5A). A BU may include a set of TUs. Each TU may be associated with a TUA. For example, a BU may include a TUA 0, a TUA 1, a TUA 2, and a TUA 3. The TUAs may map to respective buffer indices. For example, the TUA 0 may be mapped to the buffer 0, the TUA 1 may be mapped to the buffer 1, the TUA 2 may be mapped to the buffer 2, and the TUA 3 may be mapped to the buffer 3. An LBA (e.g., indicated by the write command) may be associated with a given TUA. For example, as shown in FIG. 5A, the write command may indicate an LBA 1. The memory device 120 and/or the controller 130 may translate the LBA 1 into the TUA 1 (e.g., based on a mapping of the LBA 1 (and a namespace identifier) to the TUA 1 that is stored by the memory device 120). Therefore, the memory device 120 and/or the controller 130 may store and/or write the data associated with the write command in the buffer 1.

However, because a size of the data to be written is smaller than a size of the BU, one or more buffers allocated for the write command may not include any valid data. Therefore, the memory device 120 and/or the controller 130 may perform a read-modify-write operation to merge in data to the one or more buffers and then write data stored by all of the buffers to the memory 140. In some implementations, the memory device 120 and/or the controller 130 may store indications of whether buffers, from the set of buffers, contain the valid data. For example, the memory device 120 and/or the controller 130 may store an indication that the buffer (e.g., the buffer 1) includes valid data and that remaining buffers (e.g., buffer 0, buffer 2, and buffer 3), from the set of buffers, do not include valid data. For example, the indication(s) may include one or more bitmaps. As an example, a buffer that stores valid data may be associated with a bitmap of bits all having a value of "1." A buffer that does not store valid data may be associated with a bitmap of bits all having a value of "0." A buffer that stores some valid data (e.g., but that is not full) may be associated with a bitmap where some bits have a value of "1" and some bits have a value of "0." This may enable the memory device and/or the controller 130 to identify buffers for which data needs to be read from the memory 140 and merged into the buffers.

As shown in FIG. 5B, the memory device 120 and/or the controller 130 may be configured to translate the logical address associated with the write command into a set of physical addresses, where the set of physical addresses are associated with storing data for the BU (e.g., that are associated with storing data having a size of the BU). For example, the memory device 120 may be configured to use an L2P table that maps logical addresses (e.g., that are associated with identifying data having a size of a BU) to physical addresses (e.g., that are associated with storing data having a size of a BU). In some implementations, the memory device 120 and/or the controller 130 may store data associated with a BU in sequential physical addresses in the memory 140. In other words, a constraint may be introduced that requires TUs that are included in a given BU to be mapped to sequential physical locations in the memory 140. For example, TUs that are included in a given BU may be mapped to the same region (e.g., the same block and/or the same page) in the memory 140. As an example, TUs that are included in a given BU may be mapped to sequential or consecutive codewords of a given page in the memory 140. This may enable the memory device 120 and/or the controller 130 to determine physical addresses corresponding to the TUs from a single physical address corresponding to the BU, as explained in more detail elsewhere herein.

For example, as shown by reference number 508, the memory device 120 and/or the controller 130 may be configured to translate the logical address (e.g., LBA 1) into a set of physical addresses (e.g., that are associated with a BU that is associated with the logical address). For example, the memory device 120 and/or the controller 130 may obtain a first logical address that is associated with data to be written to the memory 140 (e.g., as indicated by the write command from the host device 110). The first logical address may associated with identifying data having a first size (e.g., a size of a TU). For example, the first logical address may be an LBA or a TUA. For example, the first logical address may be "ABC00" which may be a TUA that identifies data having a size of a TU (e.g., N KB).

As shown by reference number 510, the memory device 120 and/or the controller 130 may be configured to remove, mask, and/or otherwise ignore information from the first logical address that identifies a specific location within the memory 140. For example, the first logical address may include information (e.g., one or more bits) that identifies a location in the memory 140 associated with storing data having a size of N KB (such as a specific codeword). For example, the first logical address may include one or more bits identifying a die, one or more bits identifying a plane, one or more bits identifying a block, one or more bits identifying a page, and/or one or more bits identifying a codeword, among other examples. The memory device 120 and/or the controller 130 may be configured to remove information from the first logical address that identifies a segment of the memory 140 that is associated with storing data having a size that is smaller than a size of the BU. For example, a codeword may be associated with storing N KB of data and a page may be associated with storing M KB of data. A BU may be associated with a size of M KB. Therefore, the memory device 120 and/or the controller 130 may be configured to remove information that identifies that codeword (e.g., and keep information identifying the page).

For example, the memory device 120 and/or the controller 130 may mask one or more bits of the logical address that identify a codeword (e.g., a location of memory associated with storing data having a size of the TU) associated with the physical address to generate a logical address associated with a size of the BU. For example, the memory device 120 and/or the controller 130 may generate a second logical address (e.g., "ABC") based on removing the information from the first logical address (e.g., "ABC00"). The second logical address may be associated with identifying data having a size of the BU. In some implementations, the second logical address may identify a set of logical block addresses or a set of translation unit addresses.

As shown by reference number 512, the memory device 120 and/or the controller 130 may determine, based on the L2P table mapping, a physical address that is associated with storing data having a size of the BU. For example, the memory device 120 and/or the controller 130 may query a table indicating the mapping of logical addresses to the physical addresses (e.g., the L2P table) using information indicated by the logical address of the data (e.g., using the second logical address, ABC, generated as described above). For example, the memory device 120 and/or the controller 130 may query the L2P table using information indicated by the logical address of the data to be written, where the information does not include the indication (e.g., "00") of the location of the data within the BU (e.g., that does not include an indication of a particular TU associated with the data). For example, "00" may indicate a particular TU (e.g., TUA 1) that is included in a particular BU. Therefore, the memory device 120 and/or the controller 130 may query the L2P table after masking the one or more bits (e.g., "00") of the logical address that is associated with the TU.

In other words, the logical address used to query the L2P table may be associated with identifying data having a size of M KB (e.g., where the write command indicates a logical address associated with identifying data having a size of N KB) and the physical address obtained from the L2P table may associated with storing data having a size of M KB. In some implementations, the physical address obtained from the L2P table (e.g., DEF) may be associated with a storage location in the memory 140 having a size of the BU. In some implementations, the physical address obtained from the L2P table (e.g., DEF) may correspond to a memory page or a memory block.

As shown by reference number 514, the memory device 120 and/or the controller 130 may determine a set of physical addresses associated with a size of the TU based on the logical address of the data. For example, the memory device 120 and/or the controller 130 generate a set of physical addresses that identify data having a size of the TU based on appending information, to the physical address (e.g., DEF), that identifies respective locations within the physical location identified by the physical address.

For example, the memory device 120 and/or the controller 130 may append the physical address with indicators of respective locations within a logical unit (e.g., within a BU) to generate the set of physical addresses. For example, as shown by reference number 516, the memory device 120 and/or the controller 130 may append the physical address (e.g., DEF) with bits corresponding to respective codewords associated with the physical address to generate the set of physical addresses. In some implementations, the indicators of the respective locations may indicate codewords of the memory page. In some implementations, the physical address (e.g., DEF) may be associated with storing data having a size of M KB (e.g., a size of the BU) and the set of physical addresses may each be associated with storing data having a size of N KB (e.g., a size of the TU). In other words, the set of physical addresses identify respective storage locations in the memory 140 where the storage locations have a size of the TU (e.g., N KB).

In some implementations, the set of physical addresses may be sequential physical addresses. In other words, the set of physical addresses may be sequential physical addresses indicating sequential locations on the memory 140. For example, as described above, data associated with a given BU may be stored in sequential or consecutive physical locations (e.g., stored in data locations associated with sequential or consecutive physical addresses) in the memory 140. This may enable the memory device 120 and/or the controller 130 to identify the set of physical addresses from the physical address identifying a larger storage location (e.g., "DEF"). For example, based on the constraint or restriction described above, when the memory device 120 and/or the controller 130 obtains the physical address DEF, the memory device 120 and/or the controller 130 may know that the set of physical addresses (e.g., DEF00, DEF01, DEF10, and DEF11) are to be provided to other components of the memory device 120 (e.g., backend components) to obtain data associated with the BU from the memory 140. This may enable the other components to operate using unit sizes corresponding to a size of the TU (e.g., simplifying write or read operations because the TU is used by the host device 110 to write data and/or to request access to data on the memory 140) while also enabling the L2P table to store entries corresponding to a size of the BU (e.g., thereby reducing a size of the L2P table).

As shown by reference number 518, the memory device 120 may read data from the set of physical addresses. For example, the controller 130 may provide the set of physical addresses to other components of the memory device 120 (e.g., backend components) to obtain data stored at the set of physical addresses from the memory 140. The controller 130 may obtain data stored at the physical addresses from the memory 140 based on providing the set of physical addresses to one or more backend components of the memory device 120.

As shown in FIG. 5C, and by reference number 520 the memory device 120 and/or the controller 130 may be configured to merge the data read from the set of physical addresses into the set of buffers allocated for the write command. For example, the memory device 120 and/or the controller 130 may be configured to merge the data read from the set of physical addresses into buffers, from the set of buffers, that do not include valid data (e.g., that do not include data included in the write command from the host device 110). In other words, the memory device 120 and/or the controller 130 may be configured to write the stored data to one or more buffers, from the set of buffers, that do not include the write data to generate a data unit having a size of the BU (e.g., the data stored in the set of buffers collectively may have a size of the BU).

In some implementations, the buffers in which the stored data is merged may be identified based on an order of the set of physical addresses corresponding to the stored data. For example, as described above, the set of buffers may be associated with respective indices. Similar to the logical address mapping to a buffer index, the set of physical addresses may map to respective buffers (e.g., to respective buffer indices). For example, as shown in FIG. 5C, the stored data associated with the physical address DEF00 (e.g., corresponding to a logical address ABC00) may be stored in the buffer 0, the stored data associated with the physical address DEF10 (e.g., corresponding to a logical address ABC10) may be stored in the buffer 2, and the stored data associated with the physical address DEF11 (e.g., corresponding to a logical address ABC11) may be stored in the buffer 3. Because the buffer 1 has valid data stored therein (e.g., write data received as part of the write command from the host device 110), the memory device 120 may not store the stored data from the physical address 01 in the buffer 1.

In some implementations, the memory device 120 and/or the controller 130 may identify whether a buffer, from the set of buffers, includes valid data based on the indications (e.g., the one or more bitmaps) stored by the memory device 120 and/or the controller 130, as described above. For example, the memory device 120 and/or the controller 130 may use a bitmap to determine whether a buffer is storing valid data. If the buffer is storing valid data (e.g., such as buffer 1), then the memory device 120 and/or the controller 130 may refrain from merging stored data (e.g., read data from the set of physical addresses associated with the memory 140) into the buffer. If a buffer is not storing valid data (e.g., such as buffer 0, buffer 2, and buffer 3), then the memory device 120 and/or the controller 130 may merge stored data (e.g., that is mapped to the buffer) into the buffer.

For example, a given BU may be associated with a TUA 0, a TUA 1, a TUA 2, and a TUA 3. The TUA 0 map be associated with the physical address DEF00, the TUA 1 map be associated with the physical address DEF01, the TUA 2 map be associated with the physical address DEF10, and the TUA 0 map be associated with the physical address DEF11. After merging the stored data into the set of buffers, the memory device 120 and/or the controller 130 may generate data to be written for each TUA included in the BU for the write command. For example, the buffer 0 may store data associated with logical address TUA 0 and/or physical address DEF00, the buffer 1 may store data associated with logical address TUA 1 and/or physical address DEF01, the buffer 2 may store data associated with logical address TUA 2 and/or physical address DEF10, and the buffer 3 may store data associated with logical address TUA 3 and/or physical address DEF11. This may enable the memory device 120 and/or the controller 130 to create a data unit to be written for an entire BU while enabling component(s) of the memory device 120 to operate using a TU as a logical unit or a write unit.

As shown in FIG. 5D, and by reference number 522, the memory device 120 and/or the controller 130 may write the data stored in the set of buffers to the memory 140. For example, the memory device 120 and/or the controller 130 may cause data stored in the set of buffers to be written to the memory 140 (e.g., in the set of physical addresses).

For example, after merging the stored data into the set of buffers to form the write unit for the write command, the memory device 120 and/or the controller 130 may identify a logical address associated with the write unit (e.g., with the data to be written that is stored in the set of buffers). In some implementations, the logical address may be based on, or may be, a logical address of a data stored in a first buffer (e.g., in a buffer with a lowest index value). For example, as shown in FIG. 5D, the logical address used for a translation to a physical address may be "ABC00," which may be a logical address of data stored in the buffer 0.

The memory device 120 and/or the controller 130 may be configured to translate the logical address into a set of physical addresses in a similar manner as described elsewhere herein, such as in connection with FIG. 5B. For example, the memory device 120 and/or the controller 130 may mask one or more bits of the logical address that identify a smallest unit of memory (e.g., a codeword) associated with a physical address to generate a logical address associated with the size of the BU (e.g., may remove or mask the "00" bits to generate the logical address "ABC" which may be used to identify data having a size of the BU). The memory device 120 and/or the controller 130 may query, based on the generated logical address (e.g., "ABC"), the L2P table to identify a physical address (e.g., "DEF," that is associated with storing data having a size of the BU). The memory device 120 and/or the controller 130 may determine or generate physical addresses for the data stored in respective buffers by appending information to the physical address obtained from the L2P table (e.g., "DEF").

For example, as shown by reference number 524, the memory device 120 and/or the controller 130 may append the physical address with bits corresponding to respective codewords (or other granular storage locations) associated with the physical address to generate the set of physical addresses. As shown by reference number 526, the memory device 120 and/or the controller 130 may program the data (e.g., from the set of buffers) to the set of physical addresses in the memory 140. For example, based on determining the set of physical addresses, the memory device 120 may be configured to write the data (e.g., from the set of buffers) to the set of physical addresses in the memory 140. This may enable backend components to process the write request in unit sizes of a TU (e.g., in the example depicted in FIGS. 5A-5D, four TUs may be written to the memory 140 because the configured BU size may be four TUs) while enabling the memory device 120 to store entries in the L2P table using a less granular unit (e.g., the BU).

As a result, the memory device 120 may be enabled to use a larger logical unit size for an L2P table (e.g., using a BU), while enabling other components of the memory device to use a smaller logical unit (e.g., to use a TU). This may simplify operations associated with unaligned write requests by limiting additional operations or functions to an L2P translation operation and/or a buffer allocation operation for the write request. Therefore, the memory device 120 may not need to perform additional operations or functions to process the write request for data that has a size that is smaller than the size of the logical unit used for entries of the L2P table. This may conserve processing resources and/or processing time that would have otherwise been associated with performing operations to write a smaller size of data (e.g., 4 KB) when the memory device 120 is configured to operate using a larger size (e.g., 16 KB) for entries of the L2P table.

As indicated above, FIGS. 5A-5D are provided as examples. Other examples may differ from what is described with regard to FIGS. 5A-5D.

FIG. 6 is a flowchart of an example method 600 associated with memory device operations for unaligned write operations. In some implementations, a memory device (e.g., memory device 120) may perform or may be configured to perform one or more process blocks of FIG. 6. In some implementations, another device or a group of devices separate from or including the memory device (e.g., the host device 110) may perform or may be configured to perform one or more process blocks of FIG. 6. Additionally, or alternatively, one or more components of the memory device (e.g., the controller 130, the memory management component 250, the LBA management component 260, and/or the write command execution component 270) may perform or may be configured to perform one or more process blocks of FIG. 6.

As shown in FIG. 6, the method 600 may include receiving, from a host device, a write command indicating data having a first size that corresponds to a first write unit, wherein the write command indicates a first logical address associated with the data (block 610). As further shown in FIG. 6, the method 600 may include allocating a set of buffers for the write command, wherein a quantity of buffers included in the set of buffers is based on a second write unit that is associated with a second size, and wherein the second write unit includes a set of first write units (block 620). As further shown in FIG. 6, the method 600 may include storing the data in a buffer of the set of the buffers, wherein the buffer is identified based on a position within the set of the first write units as indicated by the first logical address (block 630). As further shown in FIG. 6, the method 600 may include determining, based on the first logical address, a physical address that is associated with the second size (block 640). As further shown in FIG. 6, the method 600 may include determining a set of physical addresses corresponding to the physical address, wherein the set of physical addresses are each associated with the first size (block 650). As further shown in FIG. 6, the method 600 may include reading stored data from the set of physical addresses (block 660). As further shown in FIG. 6, the method 600 may include writing the stored data to one or more buffers, from the set of buffers, that do not include the data to generate a data unit having the second size (block 670). As further shown in FIG. 6, the method 600 may include writing the data unit to memory indicated by the set of physical addresses (block 680).

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein, such as the operations described in connection with FIGS. 5A-5D.

FIG. 7 is a flowchart of an example method 700 associated with memory device operations for unaligned write operations. In some implementations, a memory device (e.g., memory device 120) may perform or may be configured to perform one or more process blocks of FIG. 7. In some implementations, another device or a group of devices separate from or including the memory device (e.g., the host device 110) may perform or may be configured to perform one or more process blocks of FIG. 7. Additionally, or alternatively, one or more components of the memory device (e.g., the controller 130, the memory management component 250, the LBA management component 260, and/or the write command execution component 270) may perform or may be configured to perform one or more process blocks of FIG. 7.

As shown in FIG. 7, the method 700 may include obtaining a write command associated with writing data to a memory, wherein the write command indicates a logical address associated with data, wherein the logical address is associated with identifying data having a first size, and wherein the system is operating using a write unit that is associated with a set of logical units associated with the first size (block 710). As further shown in FIG. 7, the method 700 may include allocating a set of buffers associated with the write command, wherein a quantity of buffers included in the set of buffers is based on a quantity of logical units, from the set of logical units, that are associated with the write unit (block 720). As further shown in FIG. 7, the method 700 may include writing the data to one or more buffers from the set of buffers (block 730).

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein, such as the operations described in connection with FIGS. 5A-5D.

FIG. 8 is a flowchart of an example method 800 associated with memory device operations for unaligned write operations. In some implementations, a memory device (e.g., memory device 120) may perform or may be configured to perform one or more process blocks of FIG. 8. In some implementations, another device or a group of devices separate from or including the memory device (e.g., the host device 110) may perform or may be configured to perform one or more process blocks of FIG. 8. Additionally, or alternatively, one or more components of the memory device (e.g., the controller 130, the memory management component 250, the LBA management component 260, and/or the write command execution component 270) may perform or may be configured to perform one or more process blocks of FIG. 8.

As shown in FIG. 8, the method 800 may include obtaining a first logical address that is associated with data, wherein the first logical address is associated with identifying data having a first size, and wherein the first logical address includes information identifying a first location within a memory unit (block 810). As further shown in FIG. 8, the method 800 may include generating a second logical address based on removing the information from the first logical address, wherein the second logical address is associated with identifying data having a second size (block 820). As further shown in FIG. 8, the method 800 may include determining, based on the second logical address, a physical address that identifies a second location in the memory associated with storing data having the second size (block 830). As further shown in FIG. 8, the method 800 may include generating a set of physical addresses that identify data having the first size based on appending information, to the physical address, that identifies respective locations within the second location (block 840).

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein, such as the operations described in connection with FIGS. 5A-5D.

In some implementations, a memory device includes a memory; a translation component that is configured to store a mapping of logical addresses to physical addresses associated with the memory, wherein the logical addresses and the physical addresses are associated with a first size associated with a first logical unit, wherein the first logical unit includes a group of second logical units, and wherein the translation component is configured to: determine, based on the mapping, a physical address associated with a logical address of data indicated by a write command, wherein the data has a size that is less than the first size associated with the first logical unit, wherein the logical address is associated with a second size that is associated with the second logical units, and wherein the physical address is associated with the first size; and determine a set of physical addresses having the second size based on the logical address of the data; a read component configured to: read stored data, from the memory, corresponding to the set of physical addresses; and a write command execution component that is configured to operate using the first logical unit, and wherein the write command execution component is configured to: allocate a set of buffers for the write command, wherein a quantity of buffers included in the set of buffers is based on a quantity of the second logical units included in the group; store the data in at least one buffer from the set of buffers; merge the stored data into the set of buffers; and cause data stored in the set of buffers to be written to the memory.

In some implementations, a method includes receiving, by a memory device and from a host device, a write command indicating data having a first size that corresponds to a first write unit, wherein the write command indicates a first logical address associated with the data; allocating, by the memory device, a set of buffers for the write command, wherein a quantity of buffers included in the set of buffers is based on a second write unit that is associated with a second size, and wherein the second write unit includes a set of first write units; storing, by the memory device, the data in a buffer of the set of the buffers, wherein the buffer is identified based on a position within the set of the first write units as indicated by the first logical address; determining, by the memory device and based on the first logical address, a physical address that is associated with the second size; determining, by the memory device, a set of physical addresses corresponding to the physical address, wherein the set of physical addresses are each associated with the first size; reading, by the memory device, stored data from the set of physical addresses; writing, by the memory device, the stored data to one or more buffers, from the set of buffers, that do not include the data to generate a data unit having the second size; and writing, by the memory device, the data unit to memory indicated by the set of physical addresses.

In some implementations, a system includes means for obtaining a write command associated with writing data to a memory, wherein the write command indicates a logical address associated with data, wherein the logical address is associated with identifying data having a first size, and wherein the system is operating using a write unit that is associated with a set of logical units associated with the first size; means for allocating a set of buffers associated with the write command, wherein a quantity of buffers included in the set of buffers is based on a quantity of logical units, from the set of logical units, that are associated with the write unit; and means for writing the data to one or more buffers from the set of buffers.

In some implementations, a system includes a memory; and one or more components configured to: obtain a first logical address that is associated with data, wherein the first logical address is associated with identifying data having a first size, and wherein the first logical address includes information identifying a first location within a memory unit; generate a second logical address based on removing the information from the first logical address, wherein the second logical address is associated with identifying data having a second size; determine, based on the second logical address, a physical address that identifies a second location in the memory associated with storing data having the second size; and generate a set of physical addresses that identify data having the first size based on appending information, to the physical address, that identifies respective locations within the second location.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
   a memory; and
   one or more components configured to:
   determine, based on a mapping of logical addresses to physical addresses associated with the memory, a first physical address associated with a first logical address of first data indicated by a write command, wherein the first logical address is associated with a second size that is less than a first size associated with the logical addresses and the physical addresses, and
   wherein the first physical address is associated with the first size;
   read second data from a set of physical addresses corresponding to the first physical address, wherein each of the set of physical addresses is associated with the second size;
   store the first data in at least one buffer of a set of buffers;
   merge the second data into the set of buffers; and
   cause the first data and the second data stored in the set of buffers to be written to the memory.

2. The memory device of claim 1, wherein the first size is associated with a first logical unit that includes a group of second logical units associated with the second size.

3. The memory device of claim 2, wherein a quantity of buffers of the set of buffers is based on a quantity of the second logical units in the group.

4. The memory device of claim 1, wherein a quantity of buffers of the set of buffers is based on a relationship between the first size and the second size.

5. The memory device of claim 1, wherein the first data has a size that is less than the first size.

6. The memory device of claim 1, wherein a write component of the memory device is configured to operate using the first size.

7. The memory device of claim 1, wherein a table, indicating the mapping of the logical addresses to the physical addresses, has entries corresponding to respective physical addresses having the first size.

8. The memory device of claim 1, wherein the one or more components are further configured to:
   store indications of whether buffers, from the set of buffers, contain valid data.

9. A method, comprising:
   receiving, by a memory device and from a host device, a write command indicating first data having a first size, wherein the write command indicates a first logical address associated with the first data;
   storing, by the memory device, the first data in a buffer of a set of buffers,
   determining, by the memory device and based on the first logical address, a set of physical addresses, wherein each of the set of physical addresses is associated with the first size;
   writing, by the memory device, second data from the set of physical addresses to one or more other buffers, from the set of buffers, to generate a data unit having a second size that is associated with the set of buffers; and writing, by the memory device, the data unit to memory indicated by the set of physical addresses.

10. The method of claim 9, wherein: the first size corresponds to a first write unit, the second size corresponds to a second write unit, and the second write unit includes a set of first write units.

11. The method of claim 10, wherein a quantity of buffers in the set of buffers is based on a quantity of the set of first write units.

12. The method of claim 9, further comprising:
identifying the buffer for storing the first data based on a position indicated by the first logical address.

13. The method of claim 9, wherein writing the second data to the one or more other buffers comprises:
merging the second data with the first data, wherein respective buffers for the second data are identified based on an order of the set of physical addresses.

14. The method of claim 9, wherein the set of physical addresses is associated with a physical address having the second size, the method further comprising:
appending the physical address with indicators of respective locations to generate the set of physical addresses, wherein the physical address corresponds to a memory page and the indicators indicate codewords of the memory page.

15. A system, comprising:
means for obtaining a write command associated with writing first data to a memory,
wherein the write command indicates a logical address associated with a first size and associated with the first data, and
wherein the system is operating using a write unit that is associated with a second size greater than the first size;
means for writing the first data to one or more buffers of a set of buffers;
means for obtaining second data from a set of physical addresses that are sequential with a physical address corresponding to the logical address; and
means for writing the second data to one or more other buffers of the set of buffers.

16. The system of claim 15, wherein a quantity of buffers in the set of buffers is based on a quantity of first logical units, associated with the first size, included in a second logical unit associated with the second size.

17. The system of claim 15, further comprising:
means for programming the first data and the second data from the set of buffers to the memory.

18. The system of claim 15, wherein the logical address includes first information identifying a logical memory unit and second information identifying a location within the logical memory unit.

19. The system of claim 18, further comprising:
means for generating an additional logical address based on removing the second information from the logical address, wherein the additional logical address is associated with the second size.

20. The system of claim 18, wherein the first size is associated with a first logical unit that includes a group of second logical units associated with the second size.

* * * * *